(12) United States Patent
Kelly

(10) Patent No.: US 6,704,655 B2
(45) Date of Patent: Mar. 9, 2004

(54) METHOD AND APPARATUS FOR CORRECTING THE DEPTH INDEX FOR WELL-LOG DATA

(75) Inventor: Ronald C. Kelly, Austin, TX (US)

(73) Assignee: Schlumberger Technology Corporation, Austin, TX (US)

( * ) Notice: Subject to any disclaimer, the term of this patent is extended or adjusted under 35 U.S.C. 154(b) by 66 days.

(21) Appl. No.: 09/975,234

(22) Filed: Oct. 11, 2001

(65) Prior Publication Data

US 2002/0077753 A1 Jun. 20, 2002

Related U.S. Application Data

(60) Provisional application No. 60/239,688, filed on Oct. 12, 2000.

(51) Int. Cl.[7] .............................. G01V 1/40; G01B 3/12
(52) U.S. Cl. ............................................. 702/6; 33/735
(58) Field of Search ..................... 702/6, 1, 8; 33/735; 73/152; 367/81; 340/854.1

(56) References Cited

U.S. PATENT DOCUMENTS

| | | | | |
|---|---|---|---|---|
| 4,117,600 A | * | 10/1978 | Guignard et al. | 33/735 |
| 4,179,817 A | * | 12/1979 | Lavigne et al. | 33/735 |
| 4,545,242 A | * | 10/1985 | Chan | 73/152 |
| 4,718,168 A | * | 1/1988 | Kerr | 33/735 |
| 4,852,070 A | * | 7/1989 | Stuart-Bruges | 367/81 |
| 4,852,263 A | * | 8/1989 | Kerr | 33/735 |
| 5,019,978 A | * | 5/1991 | Howard, Jr. et al. | 702/6 |
| 5,062,048 A | * | 10/1991 | Coulter et al. | 702/6 |
| 5,541,587 A | * | 7/1996 | Priest | 340/854.1 |

* cited by examiner

Primary Examiner—John Barlow
Assistant Examiner—Toan M. Le
(74) Attorney, Agent, or Firm—Pehr Jansson; Briggitte L. Jeffery; John J. Ryberg

(57) ABSTRACT

A wireline well-logging data acquisition system and method with corrected depth index. The system having a winch for reeling-in a wireline cable connected to a well-logging tool. A depth index device and a cable tension meter are connected to the wireline cable. A computer system adjusts the depth index as a function of wireline tension measured by the cable tension meter. The computer system executes a method that includes a control loop for adjusting the depth index as function of the wireline tension.

18 Claims, 4 Drawing Sheets

METHOD AND APPARATUS FOR CORRECTING THE DEPTH INDEX FOR WELL-LOG DATA

This application claims the benefit of Provisional application No. 60/239,688 filed Oct. 12, 2000.

TECHNICAL FIELD

This invention relates in general to the field of acquiring data from a well-logging tool in a data acquisition system connected to a well-logging tool by an electrical cable, and in particular, to a method and apparatus for correcting the depth index of such data.

BACKGROUND OF THE INVENTION

Accurate collection of geophysical property data is a key to successful exploration and production of petroleum resources. Based on data such as electrical and nuclear properties collected in a well-bore, as well as the propagation of sound through a formation, geophysicists make an analysis useful in making many important operational decisions. The analysis includes determination of whether a well is likely to produce hydrocarbons, whether to drill additional wells in the vicinity of an existing well, and whether to abandon a well as being unproductive. Geophysicists may also use well-bore data to select where to set casing in a well and to decide on how to perforate a well to stimulate hydrocarbon flow. One method of collecting well-bore geophysical properties is by way of wireline well-logging. In wireline well-logging, a well-logging tool (also often referred to as a sonde) is lowered into a well-bore on an electrical cable, the wireline. The well-logging tool is an electrically powered measurement device that may, for example, collect electrical data, sonic waveforms that are propagated through the surrounding formation, or radioactivity counts. These measurements are usually converted to a digital form and transmitted on the wireline. Well-logging data is normally indexed by the depth at which the measurement was taken.

The accuracy of the data is a crucial element in the value of the analysis of the well-log data and the correctness of decisions made based on that data. Data accuracy depends both on the accuracy of the measurements made and on the accuracy of the depth index.

It would therefore be desirable to have a system and method for correcting discrepancies in the depth index.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
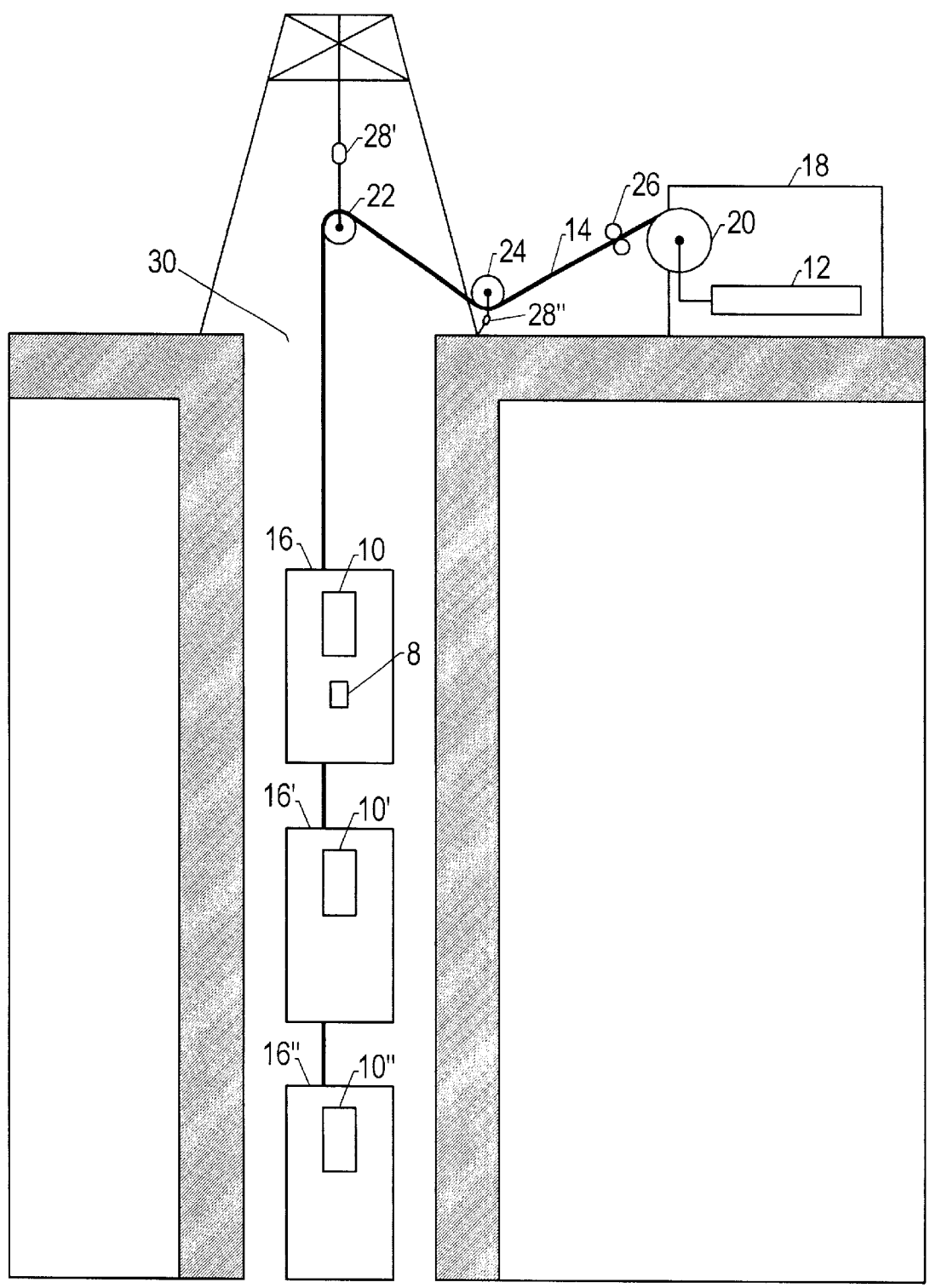
FIG. 1 is a schematic diagram illustrating a well-logging operation including application of the present invention.

In the following detailed description and in the several figures of the drawings, like elements are identified with like reference numerals.

Overview of Wireline Data Acquisition System According to the Invention

As shown in the drawings for purposes of illustration, the invention is embodied in a novel well-logging data acquisition system for correcting the depth index of data collected during a wireline well-logging operation.

In the drawings, a preferred embodiment wireline logging application is illustrated. As shown in FIG. 1, downhole electronic instruments 10 are contained in a well-logging tool 16. In a well-logging operation often several tools 16 (e.g., 16' and 16") are connected to form a tool string.

The well-logging tool 16 may also contain an accelerometer 8. The accelerometer operates to measure acceleration (ToolAcceleration) of the tool along the tool axis. The well-logging tools 16 are connected to a wireline cable 14. The tools 16, including the electronic instruments 10, are lowered into a well-bore on the wireline cable 14.

The wireline cable 14 is connected at the surface to a winch at a logging unit 18. The logging unit may be a well-logging truck or an offshore logging unit. The wireline cable 14 passes through rollers 22 and 24. The wireline cable 14 further passes through a depth-measuring device 26 for measuring the length of wireline cable 14 lowered into the borehole (MeasuredDepth). The depth-measuring device 26 may be, for example, a pair of rollers that measure how much cable has been let out by measuring the rotation of the rollers.

The wireline cable 14 is further connected to a data acquisition computer 12. The data acquisition computer 12 may be a digital computer having components such as a memory, a central processing unit, one or more secondary storage devices, e.g., a disk drive and a monitor. The data acquisition computer 12 typically contains a modem for receiving and transmitting data from and onto the wireline cable 14.

The tension on the cable (WirelineTension) is measured by a tension meter 28. For illustrative purposes, in FIG. 1, there are two tension meters 28, namely, 28' and 28". As illustrated, the tension meters may be located on the roller 22 or the roller 24 and are connected (not shown) to the acquisition computer 12.

Figure 2:
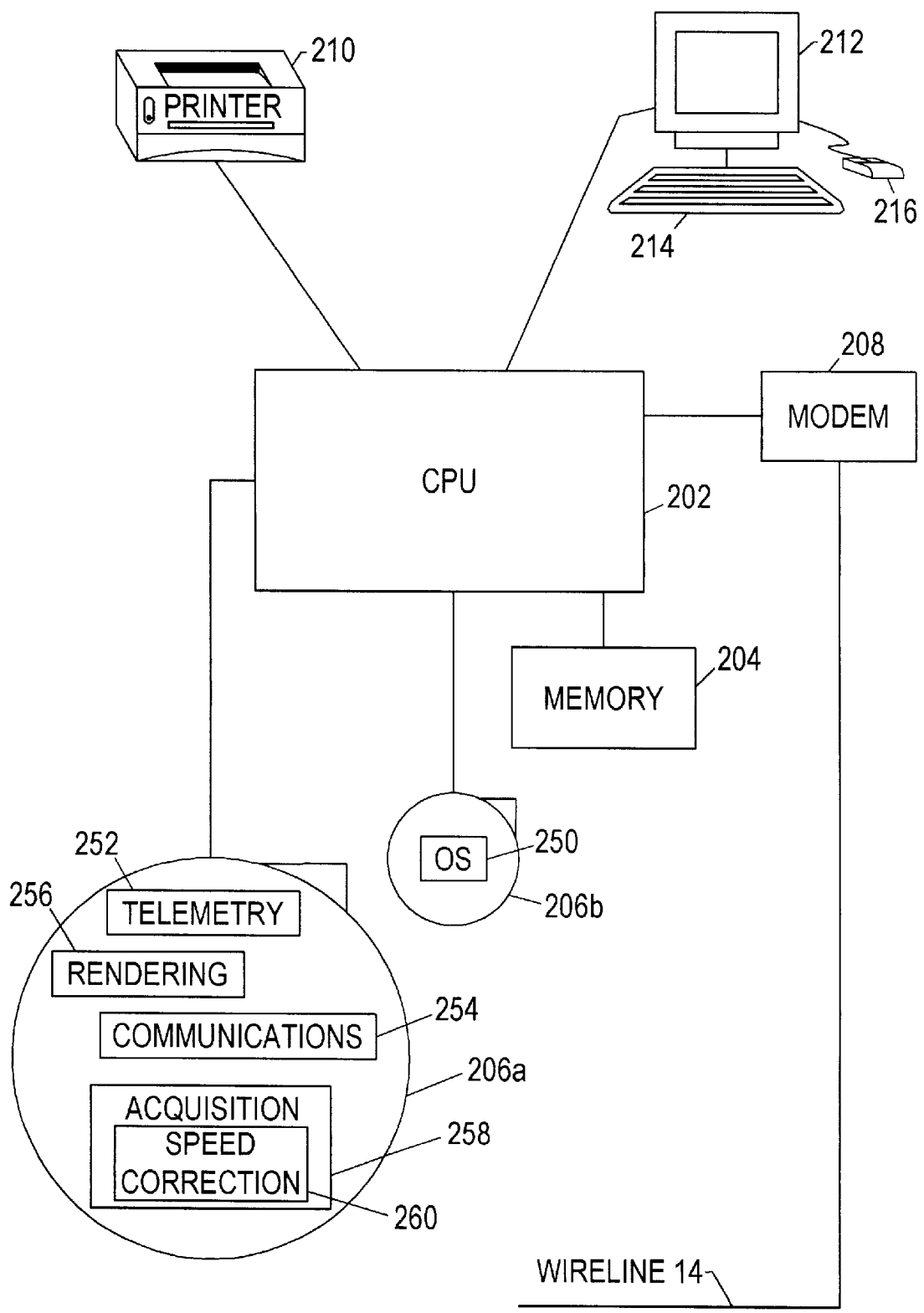
FIG. 2 is a schematic diagram of a wireline well-logging data acquisition computer system.

FIG. 2 is an exemplary illustration of the architecture of the acquisition computer 12. The surface acquisition computer 12 contains one or more central processing units (CPU) 202 (In the illustration, only one CPU is shown. However, in some implementations multiple CPUs may be used.). The CPU 12 is connected to one or more memory modules 204 (one shown). The memory modules may include, for example, random access memory (RAM), read-only memory (ROM), and erasable-programmable read-only memory (EPROM). The CPU is also connected to one or more secondary storage devices 206, e.g., 206a and 206b. The CPU is further connected to a modem 208. The modem 208 is connected to the wireline cable 14 and is operable to transmit and receive data on the wireline cable 14.

The CPU 202 may also be connected to input/output devices such as a printer 210, a monitor 212, a keyboard 214, or a mouse 216. The various devices 204 through 216 may be connected to the CPU over a bus (not shown).

The secondary storage devices store various computer programs for controlling the acquisition of data via the wireline 14. These computer programs may include an operating system (OS) 250, telemetry software 252, communications software 254, data rendering and visualization software 256, and data acquisition software 258. An acquisition software system may also include speed correction software 260 (discussed in greater detail below).

Overview of Wireline Logging Operation

Wireline logging refers to the process of lowering one or more logging tools 16 into a well-bore on a wireline cable 14. Measurements of geophysical properties are made by the logging tools 16 and transmitted over the wireline cable 14 to a computer system 12 at the surface.

The measurements include properties such as electrical properties, e.g., resistivity and spontaneous potential and radioactivity. Typically, the measurements are made at fixed depth intervals as the logging tool is being pulled up through the well bore. Each data item measured by one of the tools is mapped to a depth index collected by the depth-measuring device 26.

In the illustration of FIG. 1, the well-bore is illustrated in a highly idealized fashion as perfectly vertical with perfectly smooth walls. In reality neither is ever the case. In most cases the well-bore either intentionally or unintentionally deviates from the vertical axis. Furthermore, often well-bores have very rough walls and may sometimes have caved in to cause obstructions in the well. The bends, the borehole rugosity, the obstructions, and impediments to smooth travel in the well bore, can cause the logging tool to stick or otherwise suffer erratic motion.

Because the wireline cable has some elasticity, when extended considerable distances into the earth's crust, the cable stretches. The stretch due to the weight of the tool string and the weight of the cable is predictable. However, when a logging tool (or tool string) sticks in the well, the continued pull on the wireline 14 from the winch 20 may cause the cable to stretch allowing the winch 16 to continue to rotate and winch-in the wireline 14 at the surface. Because the tool 16 is not moving in the borehole when stuck or moving at a rate different from the rate the wireline 14 is being winched in at the winch 20, the depth index measured at the winch 20 does not accurately reflect the actual depth of the measurements by the tool 16. As the winch 20 continues to winch-in wireline 14, the tension in the wireline 14 builds up until it is greater than the force needed to cause the tool from releasing from being stuck.

At the point when the tool 16 has released from being stuck, the tension in the wireline 14 causes the tool 16 to rapidly accelerate and "yo-yo" in the borehole. The speed correction software 260 aims to produce a speed corrected depth index that corrects for the erratic tool motion due to borehole rugosity and tool sticking.

Speed Correction

Figure 3:
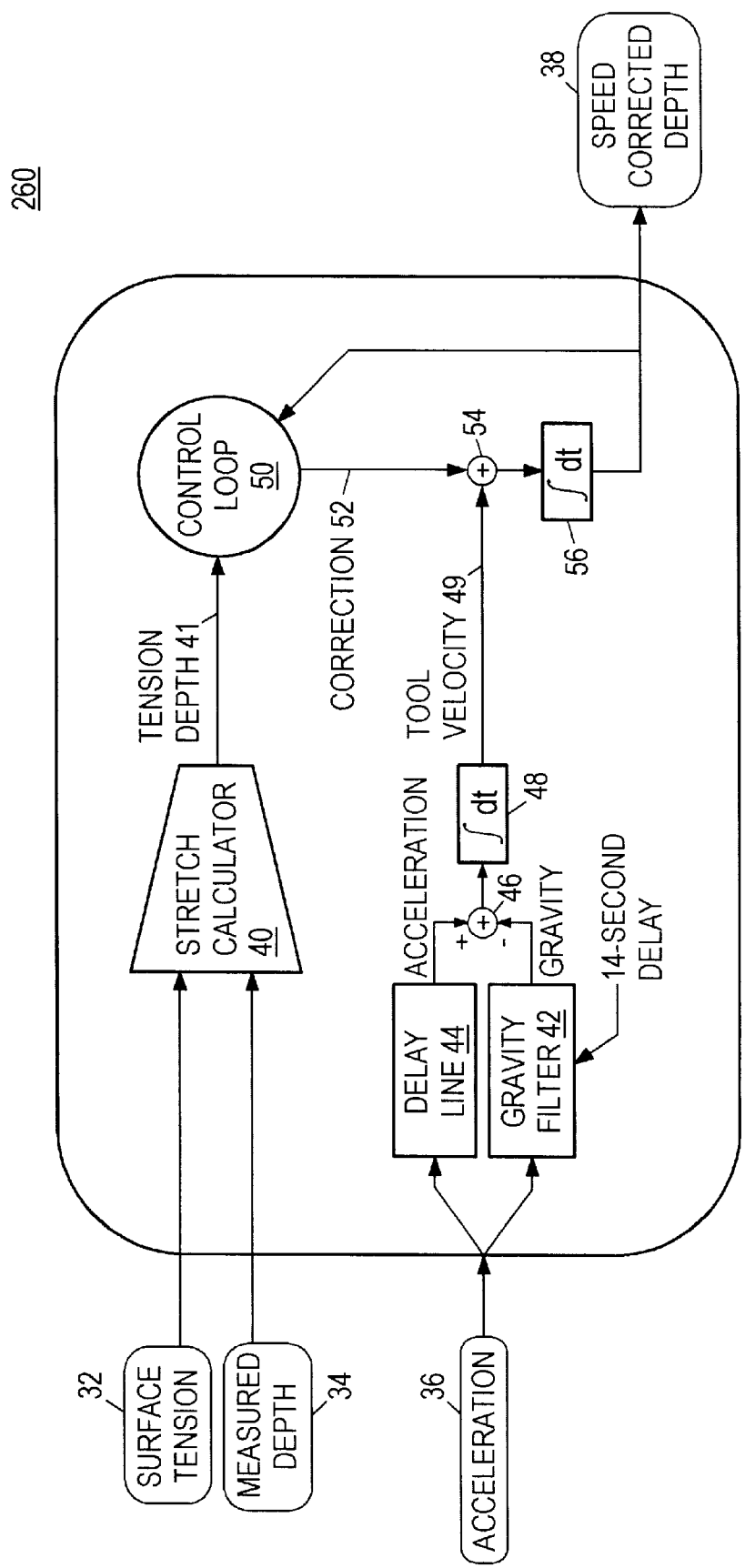
FIG. 3 is a data flow diagram of a speed corrected depth software according to one embodiment of the invention.

FIG. 3 is a data-flow diagram illustrating the operation of the speed correction software 260. WirelineTension 32 measured at the surface, the MeasuredDepth 34 as measured by the winch 20, and the ToolAcceleration 36 (if available) are input to the speed correction software 260. A SpeedCorrectedDepth 38 is output from the speed correction software 260.

The input data 32, 34, and 36 are indexed by time and are thus independent of the actual depth of the tool 16. The output SpeedCorrectedDepth 38 is indexed by time and is either output as a difference with respect to the MeasuredDepth 34 or as a depth from the surface.

The WirelineTension 32 and the MeasuredDepth 34 are input into a stretch calculator 40. The wireline 14 will stretch due to the weight of the tools 16 and the weight of the wireline 14 itself. The stretch calculator 40 accepts as a parameter a cable type. From the cable type, the stretch calculator determines (by look-up table) a stretch coefficient and cable weight for the wireline 14. Given a MeasuredDepth 34, the stretch coefficient, and tension, the stretch may be calculated by:

Stretch=depth*tension*stretchcoefficient

Figure 4:
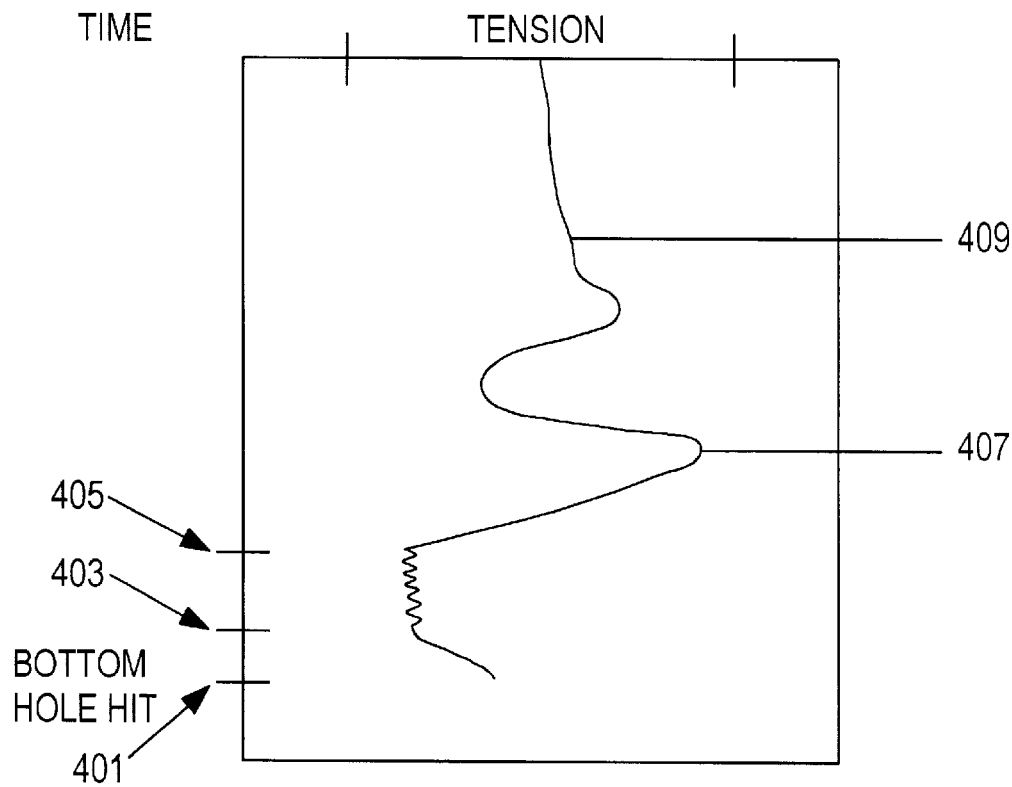
FIG. 4 is an exemplary graph showing acceleration data as a function of time around when a well-logging tool has been lowered to the bottom of the borehole.

The weight of the toolstring and the weight of the wireline will cause a certain amount of tension in the wireline 14. That tension is referred to herein as the NominalTension. As an initial step, the bottom hole NominalTension is determined. FIG. 4 is an illustration of the behavior of the measured tension data (MeasuredTension) 34 with respect to time (time increases going up the graph) at the bottom of the borehole and how the stretch calculator 40 uses that behavior to determine the NominalTension at the bottom of the hole.

During a well-logging operation, the tools 16 are first lowered into the borehole. The MeasuredTension 34 increases as wireline 14 is paid out from the winch 20. The tools 16 hit the bottom of the hole at time index 401. When the tools 16 hit the bottom of the hole the operator releases a few additional feet of wireline 14. Having an excess of wireline 14 in the hole, the MeasuredTension 34 drops as indicated between time index 401 and time index 403. The operator next starts reeling in the wireline 14. While the operator is reeling in the excess wireline 14, the tension data may be noisy as indicated between time index 403 and time index 405. The tools 16 usually stick to the bottom before moving due to the reeling in of the wireline 14. The MeasuredTension 34 ramps up until the tool breaks free from sticking as indicated between time index 405 and time index 407. When the tool breaks free (time index 407) the MeasuredTension 34 reverses. The built up tension and the breaking free from sticking causes the tool to yo-yo in the hole. As the tool yo-yos the MeasuredTension 34 oscillates, as between time index 407 and time index 409. The NominalTension is captured when that oscillation has converged below a threshold value, time index 409.

During the continued logging operation, as wireline is reeled in, the expected tension may be determined from the weight of the tools 16 and the weight of paid-out wireline 14. One method of determining the expected tension at a given depth is to first determine the tension when the tools are nominally at the surface. When the tools have just entered the borehole there is tension in the wireline from the weight of the tools and from cable weight. The NominalTension at a given depth may be determined by interpolating between the NominalTension at the surface and the NominalTension at the bottom hole.

Another method of determining the expected tension would be to use a low pass filter. The input to the filter would be MeasuredTension, the output would be NominalTension. The filter would remove tension spikes caused by sticking of the tool string, leaving the nominal tension at that depth. A similar method, but somewhat easier to implement than a low pass filter, would be to set NominalTension equal to MeasuredTension at the bottom of the well (using the procedure discussed above), then continuously drive NominalTension toward MeasuredTension as the tool string moved up the borehole. The rate at which NominalTension could converge on MeasuredTension would be limited to a value slightly greater than the expected decrease in tension.

By subtracting the NominalTension from the MeasuredTension at each time interval, a difference between the two is determined, DeltaTension.

From the DeltaTension the stretch calculator 40 determines the TensionDepth by the following:

DeltaTension=MeasuredTension−NominalTension

TensionDepth=WinchDepth+
(StretchCoefficient*DeltaTension*(MeasuredDepth+Lengthof-SurfaceCable)

Where, LengthofSurfaceCable is the length of wireline cable between the winch 20 and the opening of the borehole 30 (FIG. 1).

For certain well-logging tools 16, accelerometer data 36 is also available from an accelerometer 8. The acceleration data 36 is input to the speed correction software 260 and is indexed by time. In one embodiment, the acceleration data is collected at 480 samples per second.

From a theoretical perspective, acceleration data may be integrated twice and thereby used, together with an intial location, to determine the location of a tool. However, small errors in the acceleration data are magnified by the double integration. Therefore, the speed correction software 260 does not solely rely on the acceleration data to determine tool depth.

In most cases the acceleration data is a measurement of acceleration along the tool axis. In a perfectly vertical borehole a tool suspended in space will be subject to exactly 1G acceleration due to gravity. If the same tool is lying down in a perfectly horizontal well, the acceleration along the tool axis would be zero. As no borehole is perfectly vertical, there is a gravitational component to the acceleration data due to gravity effects caused by tool motion through the deviations of the borehole from the vertical. These gravitational effects are determined by a gravity filter 42.

The acceleration effects of sticks and borehole rugosity are of a relatively high frequency (sharp deceleration to zero tool movement followed by a sharp acceleration when the tool breaks free and high frequency oscillation during the post-breaking free yo-yo motion). However, the acceleration effects from gravity due to movement through deviations in the borehole are relatively low frequency.

Figure 5:
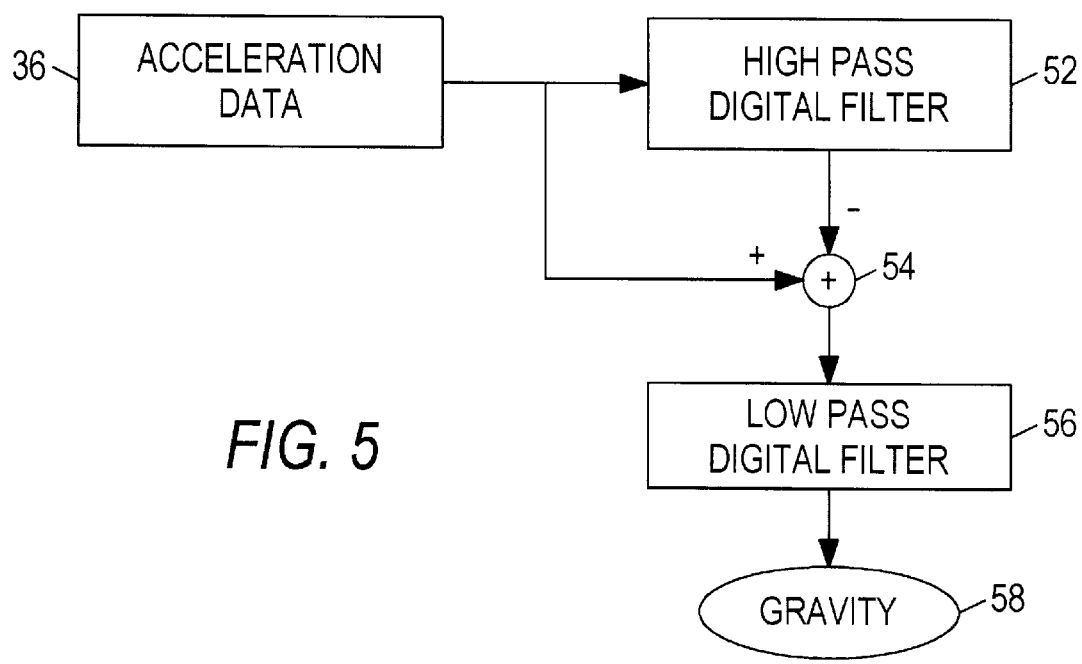
FIG. 5 is a block diagram of a gravity filter used by the speed correction software.

FIG. 5 is a graphical illustration of the gravity filter 42. The acceleration data 36 is passed through a high-pass digital filter 52. The output from the high-pass digital filter 52 is subtracted 54 from the input acceleration data 36. The resulting quantity, which represents the original acceleration but with spikes attenuated, is then fed into a low-pass filter 56. The low-pass filter removes the remaining high-frequency components in the acceleration data and thereby allows only the gravity component 58 to pass through. If the low pass filter had operated on the original acceleration data, it would have responded slightly to the spikes, causing errors. This spike response, also known as impulse response, is greatly attenuated in this design by the use of the high pass filter which removes most of the spike energy.

In one embodiment of the invention, the gravity filter 42 operates on a data sequence, for example, 14 seconds worth of data. The acceleration data is also stored in a delay line buffer 44. An adder 46 operates to subtract the gravity component from the acceleration data stored in the delay line buffer 44. The resulting acceleration data with the gravity component removed by the gravity filter 42 is input to a digital integrator 48. By integrating the acceleration data, the tool velocity is obtained. A second integration obtains SpeedCorrectedDepth 38.

Errors in the acceleration measurement accumulate quickly due to the double integration. Without the control loop, SpeedCorrectedDepth 38 would be accurate in the short term (1 to 2 seconds), but would drift unacceptably over longer periods. In contrast, TensionDepth 41 does not follow rapid tool motion but is accurate over the long term. A control loop 50 combines the short term accuracy of the acceleration-derived depth with the long term accuracy of tension depth. The control loop 50 calculates a correction function for the tool velocity (Correction) 52 from TensionDepth 41 and SpeedCorrectedDepth 38. Correction 52 is added to ToolVelocity 45.

In one embodiment, the control loop 50 is a PID (Proportional-Integral-Differential) control loop. The control loop 50 determines the Correction 52 from the following equations:

Correction=(P+D)*Boost

P=Pgain*Error*Delta_t

D=Dgain*DeltaError

Where Boost is a factor to increase the correction on certain detected events. Such events include winch speed changes, sudden changes in the tool tilt within a borehole, and detection of acceleration spikes. Boost is nominally set to one. In one embodiment Boost is set proportional to the size of spikes in the acceleration data. If the spike exceeds a given threshold (AccelerationThreshold), Boost is set to a value proportional to the amount by which the spike exceeds the AccelerationThreshold. Boost then decreases linearly with time back to a value of one. The AccelerationThreshold is a user defined parameter which in one embodiment has a value of 2.5 meters/second/second.

Pgain is a parameter, also known as the control loop amplitude. A higher value of Pgain causes the control loop to drive SpeedCorrectedDepth toward TensionDepth more rapidly. In one embodiment Pgain has a value of 0.01.

Error is the difference between the most recent SpeedCorrectedDepth 38 and TensionDepth 41.

Delta_t is the time difference between samples.

Dgain is a damping factor. It must be set high enough to prevent oscillation of the control loop. In one embodiment Dgain has a value of 0.06.

As discussed above, certain well-logging tools have no accelerometer. In such cases the Boost factor is set high (Boost=60 in one embodiment of the invention) which causes the control loop 50 to make SpeedCorrectedDepth 38 equal to TensionDepth 41.

In tough logging conditions (TLC), for example, where the path of the borehole does not allow the logging tools to be lowered by gravity alone, the tools 16 are attached to drill pipe in order to push the tools 16 into the borehole. The logging cable is still attached to the tool string to provide electrical connectivity. However, logging cable tension under TLC operations is not a reliable indicator of erratic tool motion. Under TLC operation, the control loop 50 can not use tension depth as a reference. In TLC, the control loop reference is changed to RoadNoiseDepth.

RoadNoiseDepth is computed from MeasuredDepth 34 and ToolAcceleration 36. In a TLC job, a tool string experiences considerable vibration whenever it is in motion. An accelerometer 8 detects the vibration, which is referred to herein as "road noise". RoadNoiseDepth is set equal to MeasuredDepth whenever the tool is moving, as indicated by high frequency noise in the acceleration data. RoadNoiseDepth is held at its present value whenever the accelerometer becomes quiet, which is an indication the tool string is stuck. When road noise returns (i.e., when the tool string breaks free), RoadNoiseDepth is moved toward MeasuredDepth at a rate roughly equal to the expected motion of the tool string. It is not essential that RoadNoiseDepth precisely follow this post-stick motion since only the longer-term accuracy of RoadNoiseDepth is important.

The invention has been described with a particular data flow for illustrative purposes. Modifications to that data flow are also possible and are to be considered within the scope of the invention. The invention is not limited to any of the specific features described herein, but includes all variations thereof within the scope of the appended claims.

What is claimed is:

1. A wireline well-logging data acquisition system comprising:
   a winch having a winch depth index device;
   a wireline cable connected to a well-logging tool and spooled on the winch;
   a cable tension meter connected to the wireline cable;
   an accelerometer connected to the well-logging tool and to the wireline cable and operable to measure acceleration and to output acceleration measurements to the wireline;
   a central processing unit (CPU) connected to the wireline cable, the cable tension meter, and the accelerometer; and
   a storage system connected to the central processing unit and having:
   a first logic means operable to instruct the CPU to read tension readings from the cable tension meter;
   a cable stretch calculator operable to instruct the CPU to input the tension readings and winch depth and to calculate a tension adjusted depth (TensionAdjustedDepth);
   a tool position logic operable to instruct the CPU to input tool acceleration data from the wireline cable, to convert the acceleration data into acceleration adjusted tool position (AccelerationAdjustedDepth);
   a control loop means operable to instruct the CPU to compute a speed corrected depth (SpeedCorrectedDepth) as a function of the tension adjusted depth (TensionAdjustedDepth) and the acceleration adjusted tool position (AccelerationAdjustedDepth).

2. The wireline well-logging data acquisition system of claim 1 wherein the cable stretch calculator takes into account the expected tension at a given depth and returns a difference between the expected stretch and the stretch due to a difference between actual tension and expected tension.

3. The wireline well-logging data acquisition system of claim 1 wherein the control loop is a proportional-integral-differential control loop.

4. The wireline well-logging data acquisition system of claim 3 where the proportional-integral-differential control loop determines a correction in tool velocity (Correction).

5. The wireline well-logging data acquisition system of claim 4 where the correction in tool velocity (Correction) is calculated from the equations:

$$Correction = (P+D)*Boost,$$

$$P = Pgain*Error*Delta\_t,$$

$$D = Dgain*Delta\_error,$$

Where Error=SpeedCorrectedDepth− TensionAdjustedDepth at an immediately preceding time index, Delta_t=the change in the time index from the immediately preceding time index, Delta_error=the change in Error from the Error at the immediately preceding time index, Pgain and Dgain are user tunable parameters, and Boost is a factor to increase the correction.

6. The wireline well-logging data acquisition system of claim 5 wherein

Boost is initially set to 1.0 and is reset to higher values in response to a change in winch speed.

7. The wireline well-logging data acquisition system of claim 1 wherein the tool movement logic further comprises a gravity filter for removing gravity effects on accelerometer data.

8. The wireline well-logging data acquisition system of claim 7 wherein the gravity filter comprises a high pass filter connected to a low pass filter.

9. The wireline well-logging data acquisition system of claim 8 wherein accelerometer data is input to the high pass filter, the output of the high pass filter is subtracted from the accelerometer data to produce a difference; and the difference is input to the low pass filter to produce the gravity component of the accelerometer data.

10. The wireline well-logging data acquisition system of claim wherein the tool position logic comprises a first numerical integrator for integrating acceleration data to tool velocity.

11. The wireline well-logging data acquisition system of claim 10 wherein the correction in tool velocity (Correction) is added to tool velocity to produce a sum and further comprising a second integrator for integrating the sum thereby producing the speed corrected depth (SpeedCorrectedDepth).

12. A method for producing a depth index of well-log data that corrects for effects of erratic tool motion, comprising:
    recording a depth reading correlated to a winch connected to a cable attached to a logging tool;
    measuring the tension of the cable;
    determining a tension adjusted depth (TensionAdjustedDepth) as a function of the tension;
    measuring tool acceleration at the well-logging tool;
    producing a corrected depth index (SpeedCorrectedDepth) as a function of the depth reading, the cable stretch, and the tool acceleration by;
    executing a control loop to obtain a collection in tool velocity (Correction) and using the (Correction to adjust the corrected depth index (SpeedCorrectedDepth) as a function of the tension adjusted depth (TensionAdjustedDepth).

13. The method of claim 12 wherein the control loop is a proportional-integral-differential control loop.

14. The method of claim 13 wherein the control loop determines a correction in tool velocity.

15. The method of claim 14 comprising:
    calculating the correction in velocity (Correction) from the equations:

$$Correction = (P+D)*Boost,$$

$$P = Pgain*Error*Delta\_t$$

$$D = Dgain*Delta\_Error$$

where Error=SpeedCorrectedDepth− TensionAdjustedDepth at an immediately preceding time index, Delta_t=the change in the time index from the immediately preceding time index;

Delta_Error=the change in Error from the Error at the immediately preceding time index, Pgain and Dgain are user tunable parameters, and Boost is a factor to increase the correction.

16. The method of claim 15 comprising:

initializing Boost to 1.0 and setting Boost to a higher value in response to a change in winch speed or an increase in tool acceleration.

17. The method of claim 12 further comprising:

removing the effect of gravity from the acceleration data.

18. The method of 17 wherein the step of removing the effect of gravity comprises:

passing the acceleration data through a high-pass filter;

subtracting the output of the high-pass filter from the acceleration data; and passing the resulting difference through a low-pass filter thereby removing the effect of gravity from the acceleration data.

* * * * *